F. TUREK.
FILTER.
APPLICATION FILED SEPT. 2, 1909.

969,224.

Patented Sept. 6, 1910.
2 SHEETS—SHEET 1.

Witnesses:

Ferdinand Turek, Inventor

F. TUREK.
FILTER.
APPLICATION FILED SEPT. 2, 1909.

969,224.

Patented Sept. 6, 1910.
2 SHEETS—SHEET 2.

Witnesses:
Monroe E. Miller
John A. Bornnhardt

Ferdinand Turek, Inventor
by Geo. E. Tew atty

UNITED STATES PATENT OFFICE.

FERDINAND TUREK, OF CLEVELAND, OHIO.

FILTER.

969,224.  Specification of Letters Patent.  Patented Sept. 6, 1910.

Application filed September 2, 1909. Serial No. 515,916.

*To all whom it may concern:*

Be it known that I, FERDINAND TUREK, citizen of the United States, residing at Cleveland, in the county of Cuyahoga and State of Ohio, have invented certain new and useful Improvements in Filters, of which the following is a specification.

This invention relates to filters and has for its object to provide an improved filter construction.

Figure 1:
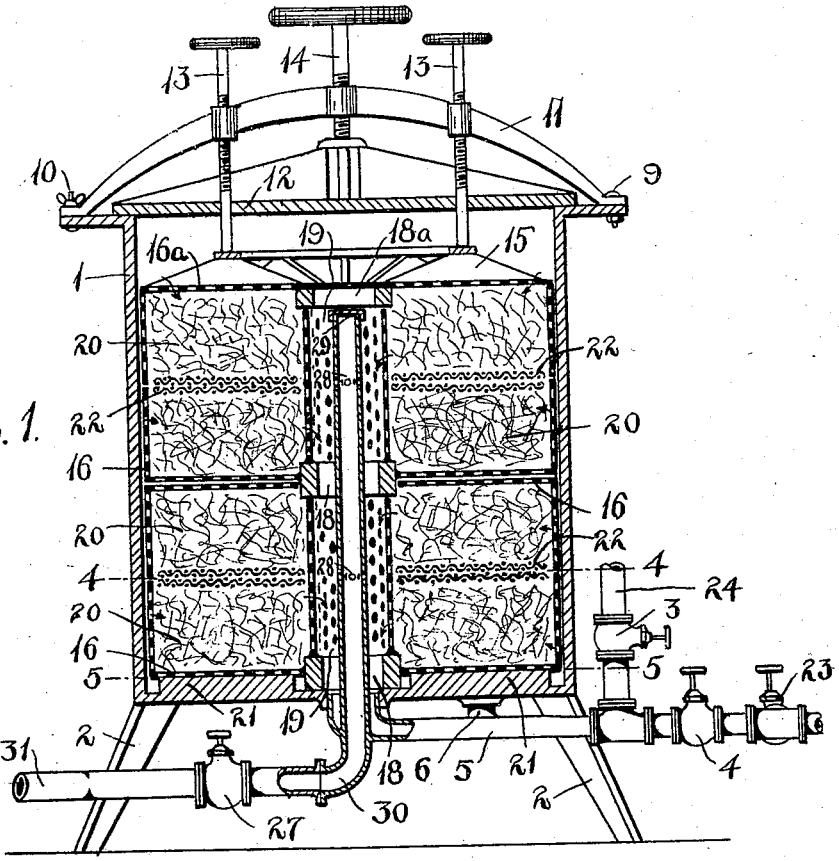
Figure 2:
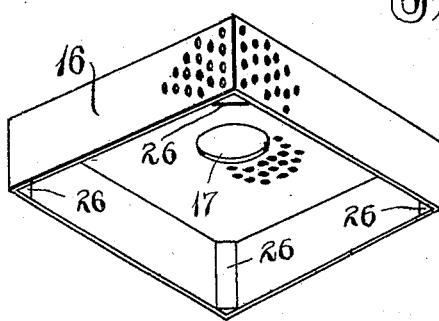
Figure 3:
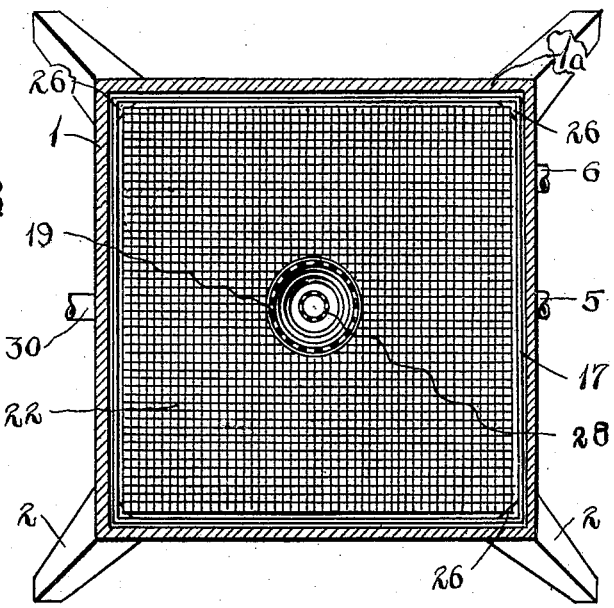
Figure 4:
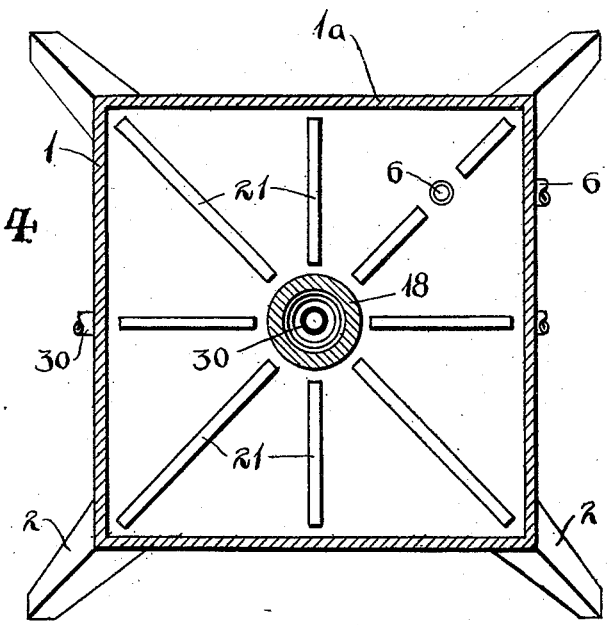

In the accompanying drawings, Figure 1 is a vertical cross section of one of the filters; Fig. 2 is a perspective of one of the filtering elements of Fig. 1; Fig. 3 is a section on line 4—4; and Fig. 4 is a section on line 5—5.

The casing of the filter is shown at 1 and stands on legs, 2 and is provided with a cover 12 which is held to the casing by means of a screw 14 with an upper handle for turning same. Screw 14 is mounted upon an arched arm 11 pivoted to the casing 1 at 9 and provided with means at 10 to secure same to the other side of the casing.

The filter is provided with a central outlet pipe 5 at the bottom, and with an inlet pipe 6 offset from the center of the filter. Said pipe 5 is provided with a valve 4 and with a branch pipe 24 having a valve 3, the branch 24 being inside of valve 4. Valve 3 is normally closed. Branch 24 is connected to a water supply (not shown) for the purpose to be hereinafter described.

The filter consists of a plurality of trays or receptacles 16 having their sides perforated, and filled with filter mass so arranged that the beer is forced through the filter mass into the outlet pipe 5 and thus filtering the beer or other beverage forced therethrough. The receptacles are rectangular as shown in Fig. 2, and have central openings 17 and also solid corners 26. They also have rings 18 secured in the central openings, and these rings connect upstanding cylindrical sieves or perforated cylinders 19. These receptacles rest one upon the other and can be assembled in any number, the ring 18 of the upper receptacle 16 setting on the cylindrical sieve 19 below. The trays or receptacles are alternately inverted and placed one above the other, the sleeves 18 projecting through the central openings to rest on the sieves 19. The upper inverted receptacle 16ᵃ differs from the receptacle 16, in that the central opening is closed and has a depending cylindrical portion 18ᵃ to rest on the sieve 19 below. Each of these receptacles is filled with filter mass 20 and has perforated plates or sieves 22 separating the filter mass of the adjacent receptacles for convenience in placing the elements of the filter together and for removing same. A spider 15 sets on the upper receptacle 16ᵃ and screws 13 which extend through the cover 12 from a cross piece 11, bear on the spider and serve as means for compressing the filter mass. The lower receptacle sets on the radially disposed ribs 21 which support same above the bottom of the chamber to allow free circulation of the beer around the base and up the sides of the filter mass.

A pipe 30 extends up the central recess and has apertures 28 in the plane of screens 22 and an upper cap 29 to close the upper end. The pipe 30 has a valve 27, and water or steam may be forced through pipe 30 when valve 27 is opened. This is used in connection with the other inlet 24, for cleaning the filter, or may be used alone. The steam and water under pressure are forced out apertures 28 and have a flushing effect, loosening up the filter mass 20 and thoroughly cleansing same. The receptacles 16 and 16ᵃ are made large enough to extend close to the casing 1, leaving just enough space for beer to pass up.

In operation, beer to be filtered is forced through the pipe 6 into the filter and through the same and out at the pipe 5, valve 3 being closed. The beer may then be passed through additional filters if desired.

If required that the filter be cleaned, the valve 4 is closed. This shuts off the beer inlet. By opening valve 3, water steam or other fluid or gases can be forced through pipe 24 and the filter in the opposite direction to which the beer was passed. Or, cleaning agents may be introduced through the pipe 30, as above described.

The layers in this filter contain the filter mass and are entirely separate and independent. The corners and middle are constructed so that the filter mass in the layers is in the compressed form desired, and consequently the layers must all work alike and the filter mass does not have to be greatly compressed, to hold it in place.

In this filter, the filter mass remains held in the sieves, the same as in the press, and the pressure does not compress the filter mass inside. Likewise when the second layer is placed upon the first it cannot compress the filter mass in the first layer. Thus the fluid has free passage in the regular filtration process, and the impurity is distributed evenly throughout the filter mass. As the layers are not in a greatly compressed form, it is easy to cleanse and rinse the filter when the impurity is being removed, which saves taking the filter apart, and prevents part of the loss of time and material incident thereto.

The rings in the middle have the purpose only of compressing the filter mass, so that the fluid may not pass through at that place; the perforated cylinders on the rings preventing the weight of the upper layers from compressing the filter mass in the lower layers, and in each corner. The trays having all sides perforated allows the liquid to flow through at all points, and no space is lost in the filters, and the entire mass works uniformly, with a free passage, the fluid not losing in quality. In this form of sieves, great pressure is not required, and power is saved.

In cleaning or washing out the filter, a central perforated pipe is introduced through which steam is blown into the spaces between the sieves, for purposes of cleaning. The steam coming into contact with the water is condensed and forms a sort of water hammer effect, which is utilized for getting rid of impurities. The water in the filter mass is not allowed to exceed a certain number of degrees, so as not to deteriorate the quality of the filter mass.

I claim:

1. A filter comprising a casing having an inlet and an outlet, and a series of trays containing filter mass superposed in said casing, the trays having perforated inner and outer side walls, the former forming a central conduit with perforations throughout the full length thereof and directly opposite the filter mass and the latter being spaced slightly from the sides of the casing, whereby liquid may flow through said side walls and the filter mass therebetween.

2. A filter comprising a casing having an inlet and an outlet, and a series of trays having perforated bottoms and sides and containing filter mass, placed one above the other in said casing, the trays being alternately inverted with the bottom of one adjacent the bottom of the other, the outer sides of the trays being spaced from the sides of the casing, and a central conduit having perforated sides, extending through the trays.

3. A filter comprising a casing having therein a series of filter units with central openings forming a conduit through said units, and a pipe extending through the end of the casing and projecting into said conduit and having spray holes in the sides.

4. A filter comprising a casing having therein a series of filter units with a central perforated tube extending through said units, and a spray pipe extending through the casing wall and into said tube and having laterally directed spray holes.

5. A filter comprising a casing, and a pair of units therein each consisting of a tray with a perforated bottom and sides and a filling of filter mass, the bottom having a central opening, and a perforated tube extending through said units and in line with the said openings, the trays being placed together with their bottoms at opposite ends of the structure.

6. A filter comprising a casing, and a series of superposed units therein comprising trays with perforated bottoms and sides and a filling of filter mass, the bottoms of the trays having central alined openings, rings in said openings, and tubes of perforated material extending through the units with perforations beside the filling and between said rings.

In testimony whereof, I do affix my signature in presence of two witnesses.

FERDINAND TUREK.

Witnesses:
MONROE E. MILLER,
HAZEL G. BOLLES.